US010042412B2

(12) United States Patent
Srivastava et al.

(10) Patent No.: US 10,042,412 B2
(45) Date of Patent: Aug. 7, 2018

(54) INTERCONNECT WAKE RESPONSE CIRCUIT AND METHOD

(71) Applicant: Intel Corporation, Santa Clara, CA (US)

(72) Inventors: Amit Kumar Srivastava, Penang (MY); Jia Jun Lee, Seberang Jaya (MY); Asad Azam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/563,079

(22) Filed: Dec. 8, 2014

(65) Prior Publication Data

US 2018/0011528 A1     Jan. 11, 2018

(51) Int. Cl.
*G06F 1/32*       (2006.01)
*G06F 9/44*       (2018.01)
*G06F 13/42*      (2006.01)
*G06F 9/4401*     (2018.01)

(52) U.S. Cl.
CPC .......... *G06F 1/3287* (2013.01); *G06F 1/3215* (2013.01); *G06F 1/3253* (2013.01); *G06F 1/3278* (2013.01); *G06F 1/3296* (2013.01); *G06F 9/4418* (2013.01); *G06F 13/4282* (2013.01); *Y02D 10/151* (2018.01); *Y02D 10/157* (2018.01)

(58) Field of Classification Search
CPC .... G06F 1/3287; G06F 1/3278; G06F 1/3296; G06F 9/4418; G06F 13/4282
See application file for complete search history.

(56) References Cited

U.S. PATENT DOCUMENTS 7,079,571 B1 * 7/2006 Chen ................. H04L 1/243
                                                370/247
8,713,338 B2 * 4/2014 Mobin ............... G06F 1/3203
                                                713/323
2009/0153211 A1   6/2009 Hendin et al.
2010/0036992 A1   2/2010 Sisto et al.
2014/0195835 A1   7/2014 Zheng et al.
2014/0281626 A1   9/2014 Younger et al.

FOREIGN PATENT DOCUMENTS

WO    2007143695 A2    12/2007

OTHER PUBLICATIONS

International Preliminary Report on Patentability for International Patent Application No. PCT/US2015/064326, dated Jun. 22, 2017.
International Search Report and Written Opinion for International Patent Application No. PCT/US2015/064326, dated Apr. 15, 2016, 14 pages.

* cited by examiner

*Primary Examiner* — Stefan Stoynov
(74) *Attorney, Agent, or Firm* — Green, Howard & Mughal LLP

(57) ABSTRACT

In some embodiments, provided are circuits and approaches for responding to wake requests over a data bus such as with a USB interface. An interconnect PHY may be placed into an aggressive power reduction mode and in response to a detected wake request on the bus, respond in a sufficient time by keeping at least a portion of a transmitter data path in the PHY powered on during the reduced power mode and responding to the wake request while the PHY re-boots in the background.

20 Claims, 10 Drawing Sheets

INTERCONNECT WAKE RESPONSE CIRCUIT AND METHOD

TECHNICAL FIELD

Embodiments of the present invention relate generally to interconnect power reduction, and in particular, to aggressive power reduction solutions for interfaces such as USB2 and beyond with fast wake-up response requirements.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
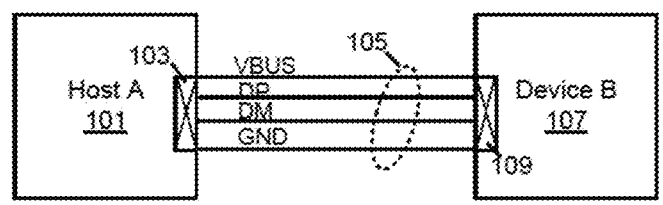
FIG. 1 shows a USB2 link between first and second communicating devices.

FIG. 1 illustrates a pair of communicating devices (A and B) coupled together through a USB2 link. the first communicating device 101 (referred to as host) has USB2 port 103, while a second communicating device 107 (refer to as device) has a USB2 port 109. The devices are coupled together through a USB cable 105, which is connected at either end to ports 103 and 109. Power is provided on power lines (VBUS, GND), while data is driven through differential data lines DP and DM.

The Universal Serial Bus (e.g., USB, Rev. 2 "USB2") is an interconnect (serial I/O) bus specification developed to facilitate convenient plug-and-play communications between computing devices such as between computers, mobile devices, and peripheral appliance devices. For example, a computer, functioning as a USB host, could be coupled to multiple devices such as tablets, mobile handsets, and/or camera devices. (Note that with USB communications, one of a linked set of devices typically functions as a "host", thereby overseeing, or controlling, the communications between itself and the other connected device(s). Any device may be a host as long as it has appropriate functionality such as a host controller, etc.)

USB specifications define a so-called "suspend" mode where a USB port can be put into a reduced power state if there is sufficiently little activity over its USB bus (e.g., if there is no activity for a duration of at least 3 ms). In turn, the USB2 interface also defines a remote wake capability for a device (e.g., mobile device) to wake-up the suspended port to which it is connected in order to initiate communications over the USB bus. (USB2 is meant to refer to any USB specification that includes suspend functionality such as that described in a USB2 specification or later as pertaining to the inventive teachings disclosed herein.)

Figure 2:
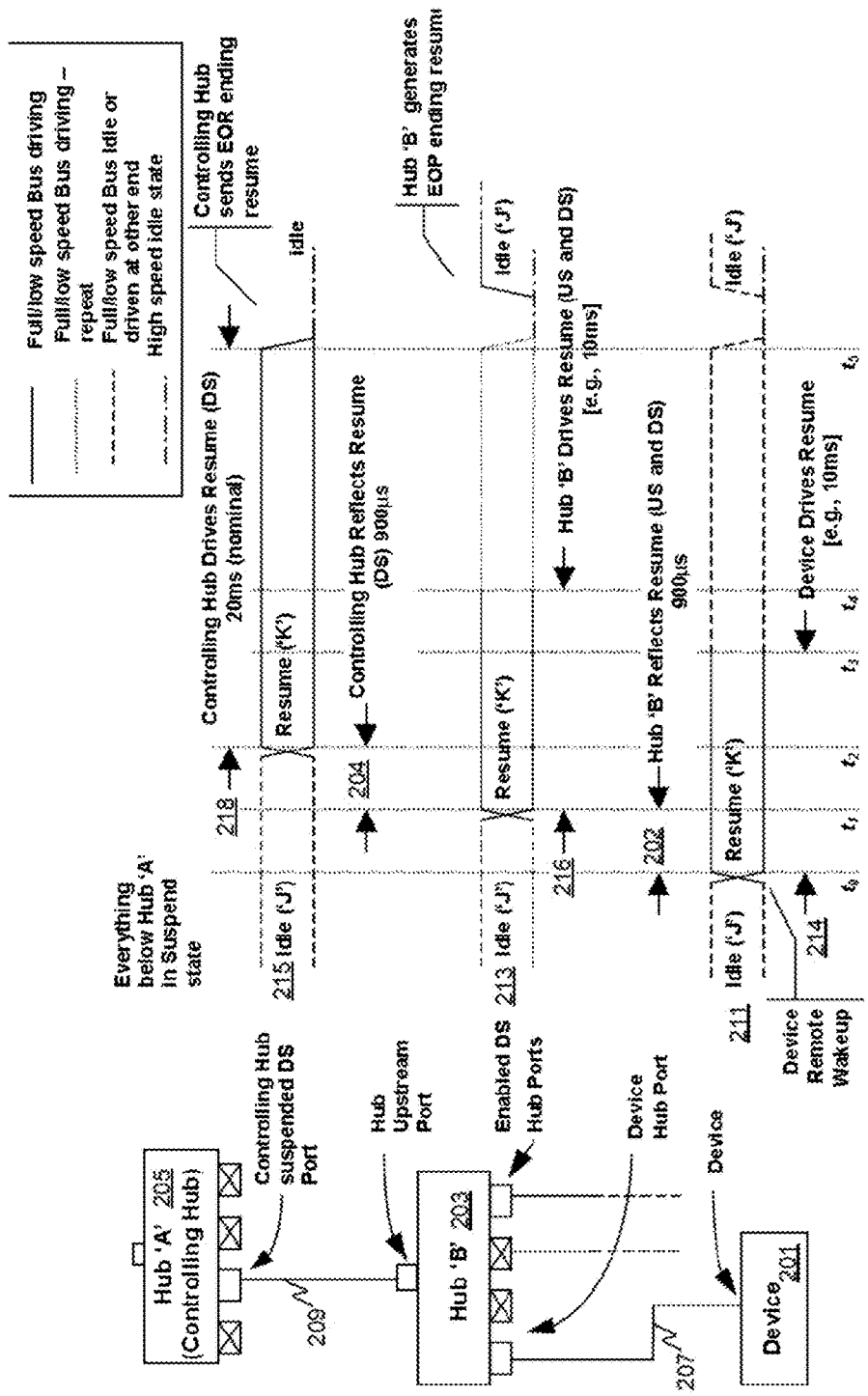
FIG. 2 is a timing diagram illustrating a USB2 remote wake timing requirement.

An exemplary timing diagram for USB2 remote wake operations is shown in FIG. 2. A device 201 is to wake up a suspended Hub "B" 203 in order to awaken and communicate with a Hub "A" 205, which serves as a controlling hub in this example. The device 201 is connected to Hub "B" via USB line (e.g., cable) 205, while Hub "B" is connected to Hub A via line 209.

The timing diagram shows the signal states for the three port drivers: 211 for the device driver (at Device Hub Port), 213 for Hub "B" Upstream Port driver, and 215 for Hub "A" Downstream driver. Initially, at 211, the drivers are all at an Idle ("J") state (their differential lines at DP=1, DM=0). At 214, the device drives a "K" state (DP=0, DM=1) onto bus 207 to wake up the suspended port of Hub B. In asserting the "K" state, the device drives a relatively strong pull down on the DP line and a relatively strong pull-up on the DM line. At 216, it can be seen that Device transition to the K state initiates Hub B (timing at 213) to drive a K state at its Upstream port onto bus 209, and it also drives a "reflected Resume" K back to the device from its Downstream (Device) Port onto bus 207. The specification requires that the interval (indicated at 202) from the Device driving the remote K to the time Hub B reflects back a resume K should be no longer than 900 uS. Likewise, when Hub B drives a K onto bus 209, it causes the suspended downstream (DS) port of Hub A (205) to reflect back a resume K (indicated at 218) onto bus 209 within 900 uS. This interval is indicated at 204. If for some reason, the Host (Hub A) or Hub B does not reflect its respective resume K within its 900 uS interval, then the device 201 will treat the hubs as still in Idle, causing it to revert back to an Idle state.

Figure 3:
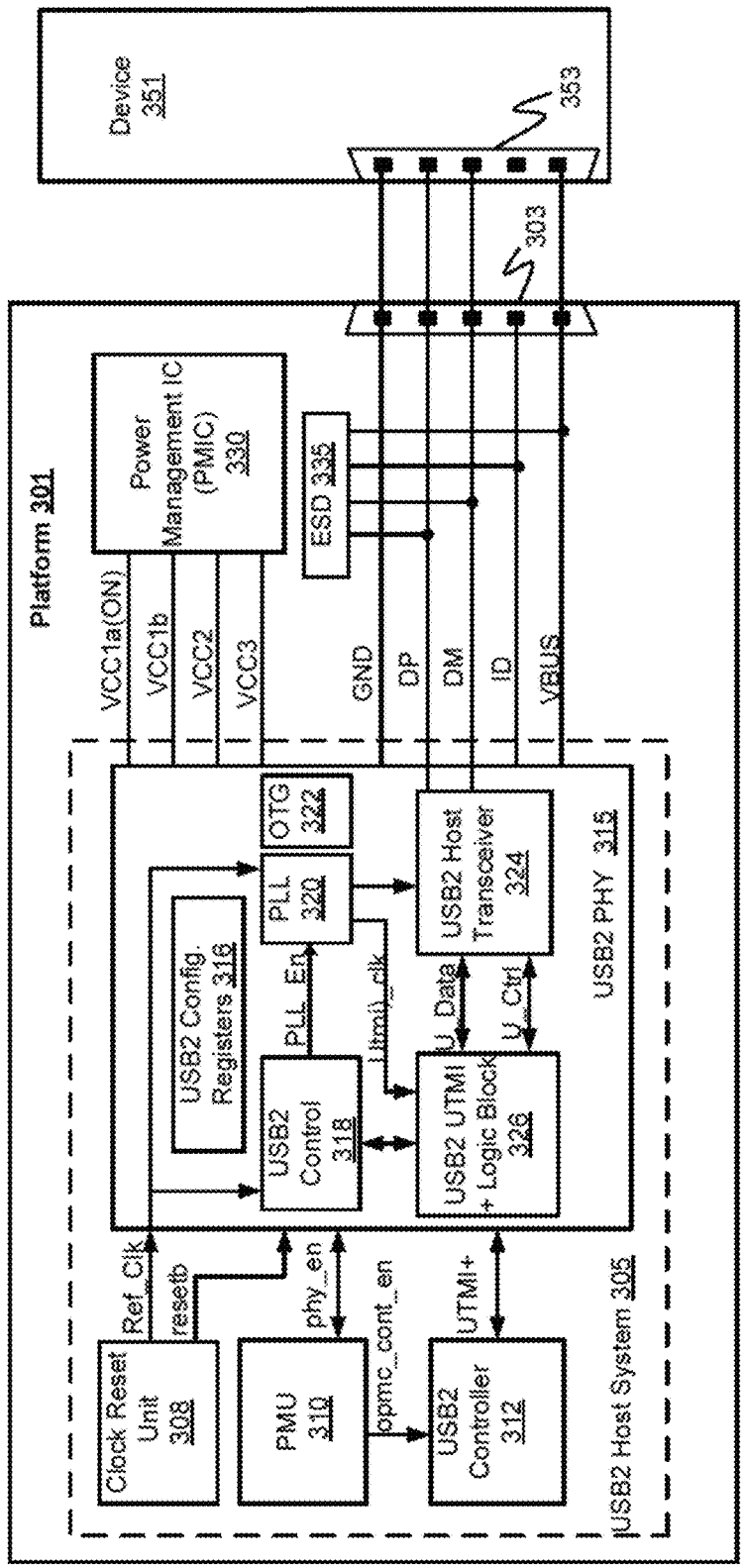
FIG. 3 is a block diagram showing a conventional USB2 interface and it's related platform components.

FIG. 3 illustrates a conventional USB2 implementation with a device 351 coupled to a platform (as host) 301 through a USB2 bus. The device 351 has device connector 353 connected to a corresponding platform connector 303 of the platform 301. The USB bus includes power lines (VBUS and GND) and a differential data bus formed from signal lines (DP and DM).

Pertinent to the USB2 link, the platform 301 includes a USB2 host system 305, power management IC (PMIC) 330, and ESD components 335, coupled together, and to connector 303, as shown. The USB2 host system 305 may be part of one or more chips for performing platform functionality. For example, it might be part of a system-on-chip (SoC) for implementing a mobile handset or other personal computing platform.

The USB2 host system 305 includes a clock reset unit 308, power management unit (PMU) 310, USB2 controller 312, and USB2 PHY block 315, coupled as shown. The PHY block 315 further includes configuration registers 316, USB2 control logic 318, PLL 320, OTG 322, and USB2 host transceiver 324.

PMIC 330 provides power to the platform (e.g., to the platform SoC) and in turn, provides power to the USB2 host system 305. The clock reset unit 308 provides a reference clock and a reset to the USB2 PHY 315. Power management unit 310 provides enable control for the USB2PHY 315 and is responsible for providing system power confirmations and firewall signals (not shown in the FIG.). The USB2 controller 312 is responsible for controlling data packet transfer initiation; suspend and resume initiation; and to interact with the USB2 PHY for facilitating data communications. A control signal (opmc_cont_en) for the USB2 controller 312 comes from power management unit 310.

Unfortunately, during a suspend mode (USB2 bus suspended), it is difficult to shut down much, if any, of the power to the USB2 PHY 315 and still be able to meet the requirement that the platform's USB2 port reflects back to the device a K state (or resume-K) within 900 uS after receiving from it a remote K wakeup. Accordingly, known solutions typically maintain the PHY 315 substantially powered up, which makes this approach power hungry. For example, prior USB2 PHY solutions may consume more than 600 uW of power during suspend modes for single port configuration (one USB2 port configuration) and 1.85 mW for ten port configuration. This may fall short of desired power reduction objectives, for example, in the range of 1 to 1.5 mW for SoC IO ports in handset and tablet applications. Accordingly, new solutions are desired.

In some embodiments, a new approach is provided for aggressively reducing idle power by Power gating much of a USB2 PHY. In some embodiments, a robust wake detection scheme for low power may be provided to detect the presence of a device exiting from a suspend state with sufficiently low latency to meet specification requirements. In some embodiments, since a USB2 PHY will typically re-configure when coming out of powered down modes where exit latencies would otherwise be in the order of more than 600 us, much reconfiguration may be bypassed by initially using saved configuration state information (e.g., last configuration state prior to power-down).

A USB system (e.g., USB2 host or device system) may be made so that much of a PHY transmitter data path, apart from the powered down portions, are in an "always on" domain and when the remote wake is detected, limited retention registers, also in an always on domain, are used to reflect a resume-K signal, while a normal power-up calibration may be done in the background. The USB2 PHY may thus be placed in an ultra-deep power mode and then enabled, e.g., after getting indication of wake-on connect Logic.

Figure 4:
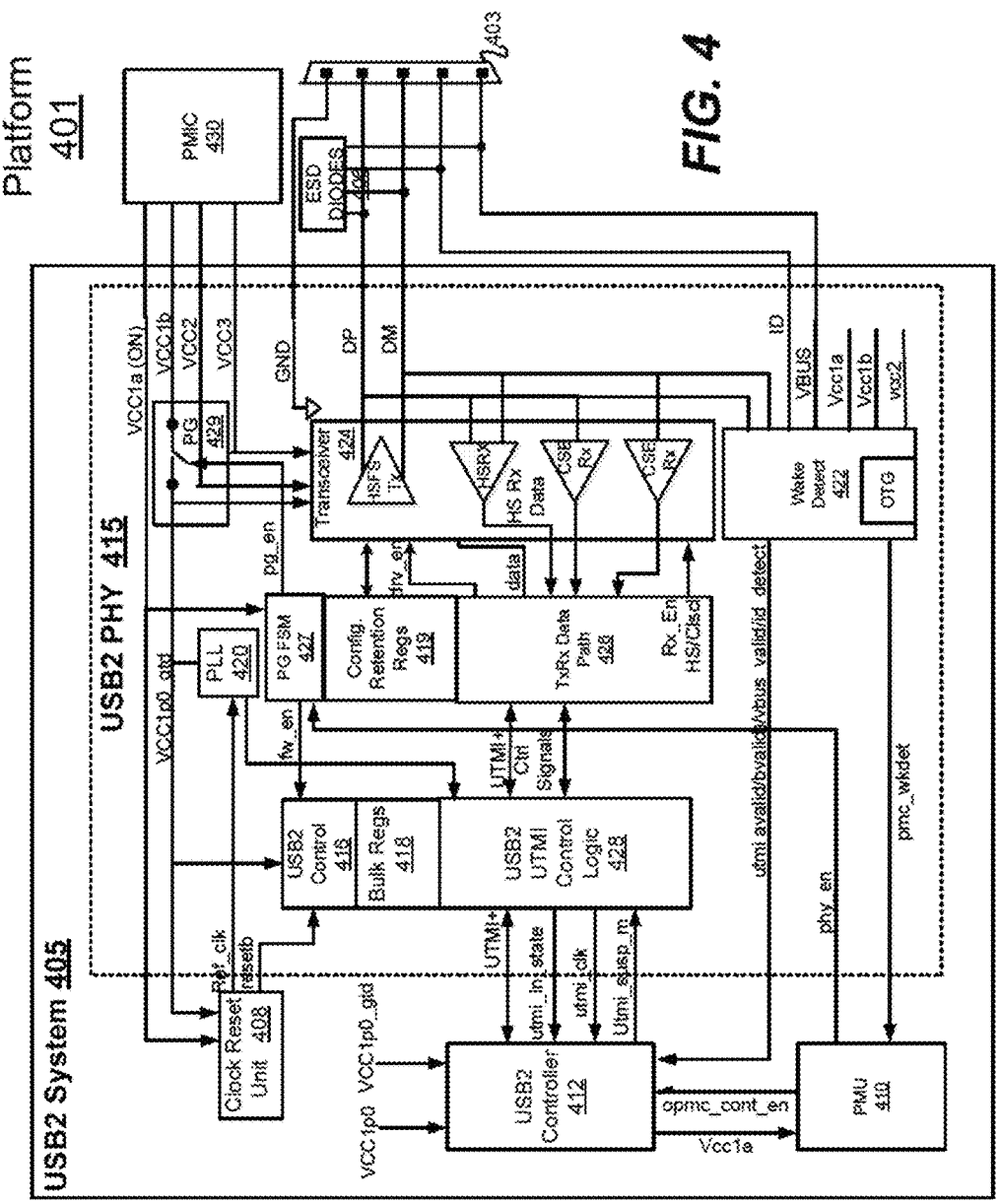
FIG. 4 is a block diagram showing an interconnect interface such as USB2 with a capability of executing a fast remote wake up response in accordance with some embodiments.

FIG. 4 shows a computing platform 401 with circuitry for implementing a resume-K in response to a wake event in a USB system 405 in accordance with some embodiments. In the depicted embodiment, system 405 includes a clock reset unit 408, power management unit PMU) 410, USB2 controller 412, and USB2 PHY 415, coupled as shown, to provide a USB2 port connection through connector 403. Also shown is PMIC 430 to provide power to the USB2 system 405. The PHY 415 includes USB2 control logic 416, bulk registers 418, configuration retention registers 419, PLL 420, wake detect circuit 422, transceiver 424, power domain control logic (e.g., finite state machine) 427, UTMI control logic 428, and power gate array 429, coupled together as shown.

The USB2 PHY 415 interacts with the USB2 controller 412 to implement USB2 communications protocol. Clock and resets for the USB2PHY 415 are control by clock reset unit (CRU) 408. In some embodiments, USB2 PHY 415 may be part of a multi role interface, (e.g., dual role device) where the host can also configure as a device. Host or Device (DRDs i.e Dual Role Device) are used across multiple applications including but not limited to computer and peripheral device data communication, storage communication, Bluetooth communication, touch sensor communication, camera and wireless fidelity (Wifi).

When a remote K state occurs on the data line (DP/DM), it is detected by wake detect circuit 422, which is at least partially powered during a suspend (e.g., reduced power such as a deep sleep) mode. The wake detect circuit 422 asserts a wake detect signal (pmc_wkdet) received by the PMU 410. The PMU 410 controls power gate array 429 to control power provided by the PMIC 30, which is responsible for supplying power to the USB2 PHY, with the VCC1a supply being "always on" (e.g., suitably, if not constantly, on during a sleep or suspend mode). The power gate array 429 has distributed power gates for the multiple sub blocks of the USB2 PHY 415. The PG FSM 427 controls the power gates in the power gate array 429. The PG FSM 427 is responsible for controlling the power gating for the individual power domains and for generating firewall and power "good" assertions for the gated domains.

The wake detect circuit 422 is at least partially powered by the VCC1a (always on) supply to monitor the DP/DM line and provide indication to the PMU 410 when activity over the USB2 bus (DP/DM line) occurs, e.g., when a remote K wake event occurs. Wake detect 422 may also be responsible for VBUS and ID indication. (VBUS and ID detection may be used for saving power when the USB2 PHY is operating in a device mode.) The wake detect circuit 422 includes a reasonably low power voltage reference generation circuit for detecting the signal states of these lines.

The transceiver data path 426 includes logic to identify prim-K data (data to be used for priming at least part of the Tx path used for resume-K signaling) based on the connected device parameters (e.g., speed) before going into a low power (suspend) state. This information is then stored in configuration retention registers 419, which are powered on during the suspend state, to enable a Tx driver (e.g., FS Tx in transceiver 424) to quickly reflect a resume-K on the data line when the remote K wake is detected. TxRx config registers 419 need not consume excessive power since only limited state information need be saved in the registers 419 for reflecting a suitable resume K.

The UTMI control logic 428 provides an interface between the USB2 controller 412 and the USB2 transceiver 424. When the controller is awoken out of a reduced power mode, it will start driving resume-K data asynchronously. A prime-K (primed Tx data path) initially helps in driving glitch free resume-K over the bus when the transmitter is enabled.

Figure 5:
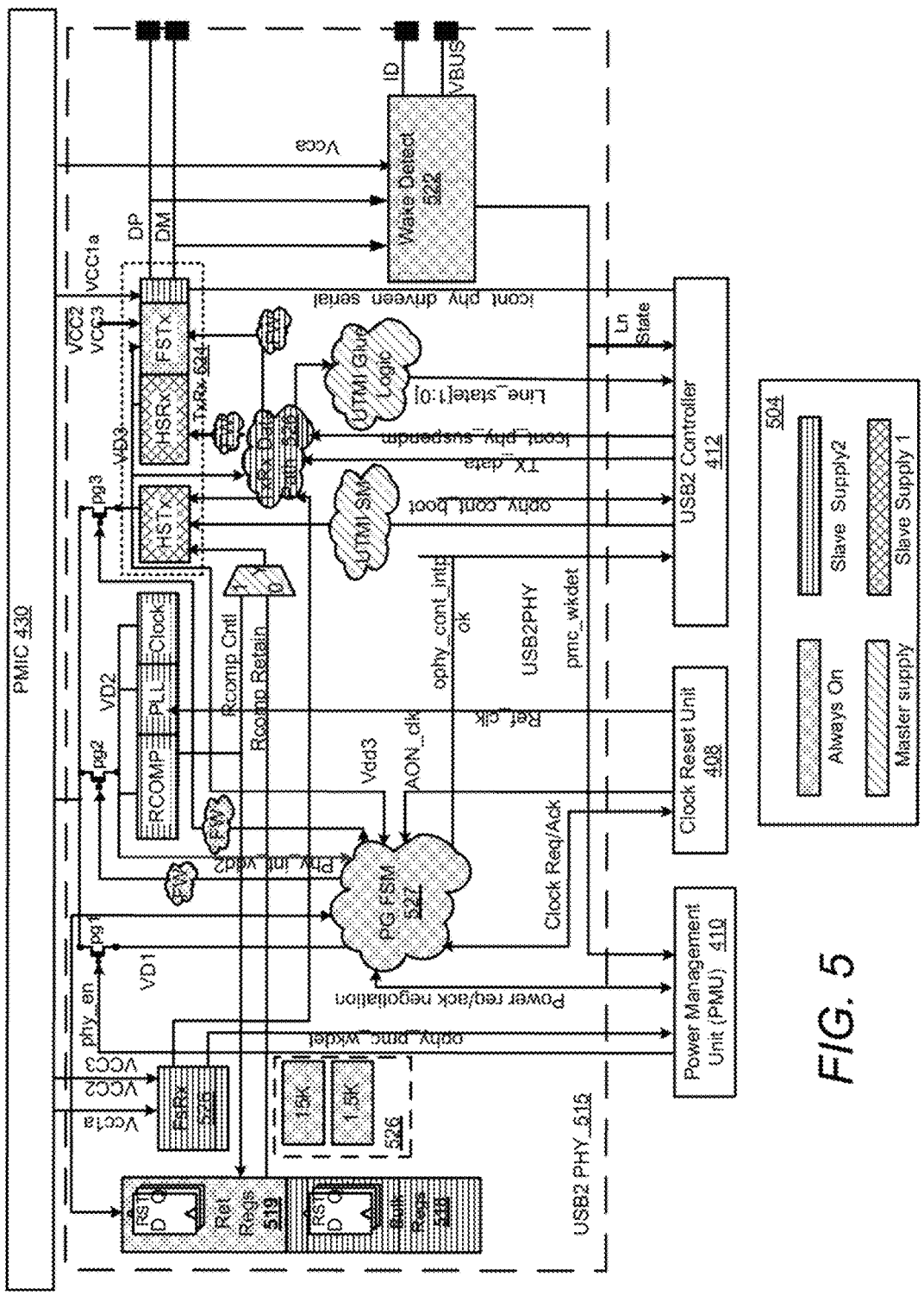
FIG. 5 is a block diagram showing an embodiment of the interface of FIG. 4 with a power partitioning scheme for aggressively reducing power in the interface during a reduced power mode.

FIG. 5 shows a detailed implementation of a USB2 PHY 515 in accordance with some embodiments. IN this drawing, power gated domains are shown using hatching, which is defined in diagram legend 504. In the depicted embodiment, there are at least four separate power domains including Always On, USB2 Master Supply (VD1), USB2 Slave Supply 1 (VD2), and USB2 Slave Supply 2 (VD3). Note that the Always On supply refers to a supply that is at least on during a suspend, or sleep, mode in accordance with maintaining sufficient information for meeting reflect K timing requirements but may, of course, actually be off during some times, e.g., when a chip is powered off. The other three supply modes may be powered down during most, if not all, of a sleep mode. This may facilitate intelligent and aggressive power partitioning, which helps in configuring USB2 PHY 515 into aggressive if not deepest low power states.

As can be seen, "always on" blocks include retention registers 519, wake detect circuit 522, full speed transmitter (FS Tx) in transceiver 524, 15K/1.5K detection 526, PG FSM 527, and firewall blocks (FW). The 15K/1.5K detection circuit 526 turns on host termination. The wake detection circuit 522 includes VBUS detection circuitry to identify if a host is present (when USB PHY is in a device mode); ID detect circuit for detection of a host or a device; and data line detection circuit for detecting a wake event (e.g., J to K transition upon a remote wake event).

In the depicted embodiment, there are at least three separate gated power domains controlled using distributed power gates. They are represented as being powered/controlled from power gates pg1, pg2, and pg3. The PG FSM 527 controls power gate domains 2 and 3 (via power gates pg2 and pg3) based on USB2 transceiver configuration state information in bulk configuration and retention registers 518, 519.

Configuration registers (including bulk registers 518 and retention registers 519), among other things, store operational configuration (operational parameter states) for the USB2 PHY transceiver 524. These configuration states may include but are not limited to calibration codes for termination, driver strength, and bus speed. In order to achieve a sufficiently fast resume K, before going into the reduced power mode, at least some of these codes are save by retention registers 519, which will be available during a suspend mode when a resume-K (or J to K transition) is to occur. To save power aggressively, relevant flops needed for driving a sufficient resume k may be stored in the "always on" domain, while the rest of the configuration register flops (518) are in a gated domain (slave supply 2 or VD2 in the depicted embodiment).

Some portion of the PG FSM 527 (not relied on for resume-K) may be powered by one or more of the gated domain supplies (e.g., Vdd1). The Power gate Finite state machine or PGFSMglue logic may also be supplied by a power gated domain VD1, which may be turned-on first (relative to other gated domains) and controlled by PMU 410. The RCOMP, PLL, clocking control logic blocks are partitioned into the VD2 gated domain. The HSTX and HSRX blocks, which are part of transceiver 524, and UTMI data path and logic are partitioned into the VD3 (slave supply 2) domain, which is activated as needed based on bus (w.g., USB2) operation. On the other hand, the FSTx block, which in this embodiment, is responsible for resume-K, is partitioned into the VD1 domain (master supply domain) so that the interface reflects a resume K immediately after getting indication from the controller.

Figure 6:
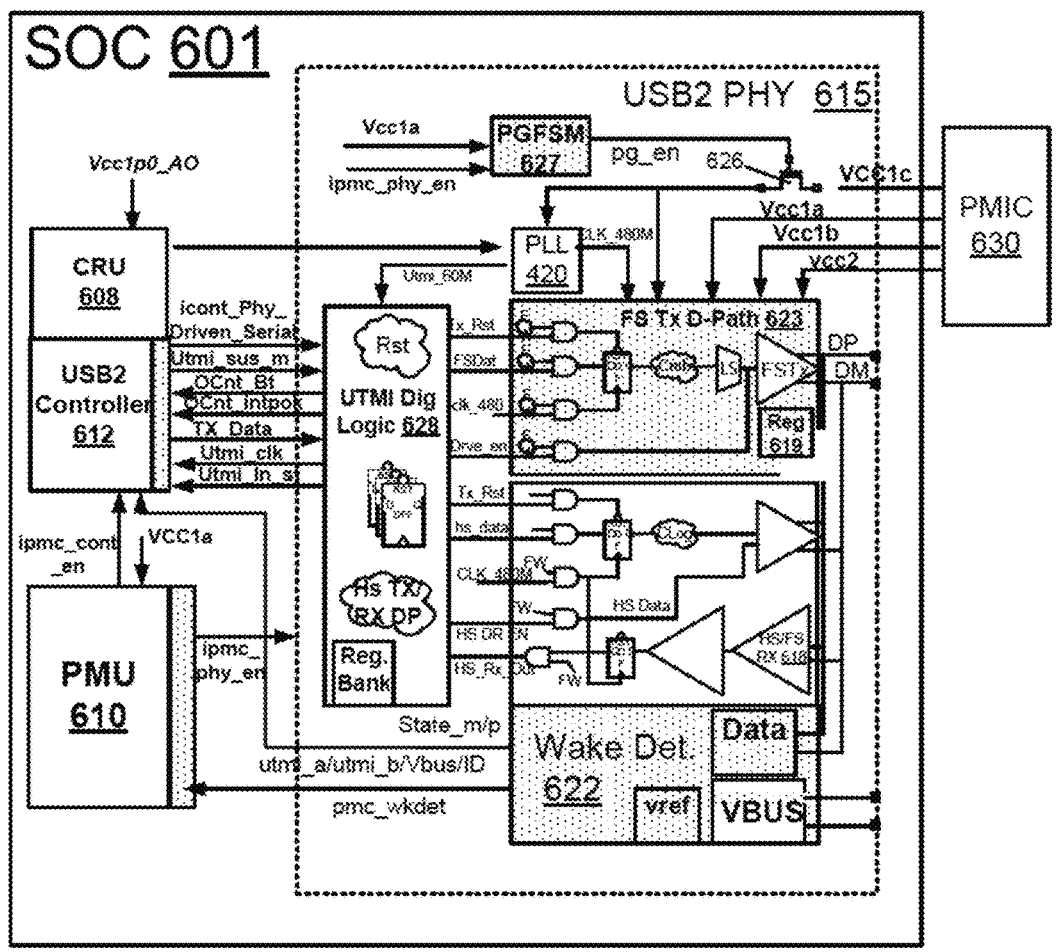
FIG. 6 is a diagram highlighting portions of a PHY for the interfaces of FIG. 4 or 5 in accordance with some embodiments.

FIG. 6 is a block diagram showing a USB2 PHY 615 with aggressive power gating that is capable of providing a sufficiently responsive resume K upon a remote wake event. Sufficient Portions (if not all) of the shaded blocks are in an always on power domain for executing the resume K upon the wake detect circuit sensing a transition to a K state on the data line.

Before the USB2 PHY 615 enters a low power mode, the UTMI digital control logic 628 causes configuration information for the FS data path 623 relevant to resume-K reflection to be stored in the configuration retention register 619. This configuration information may include, for example, driver driving strength, termination parameters, and state of device speed. In this way, as soon as power is applied back to the PHY, the FS transmitter driver doesn't need to wait for its configuration calculation states and is able to reflect a resume-K sufficiently fast.

During a low power mode (e.g., sleep mode), the wake-detect block 622 is in an always-on supply domain, e.g., with a first supply (VDD2; 1.8V) for PHY level components and a second supply (VDD3; 3.3V) for bus signal levels. The wake detect circuit monitors the data bus state activity. If a remote K wake (data bus transition from J to K state) occurs, the wake-detect circuit asserts an indication signal (wk_det) to the PMU 610, which enables the PHY 615 by asserting an indication signal (ipmc_phy_en). This causes the PG FSM 627 to activate the internal PHY power gates and signal firewalls.

The state of the FS data path 623, which in this embodiment includes flops, combining logic, and a level shifter, when put into the low power state is "primed" to output a K data state so that it is immediately ready to drive the resume K when the PHY is "awoken" and the FSTx is turned on. This also can provide for a glitch-free data transmission, e.g., it can provide for smooth operation over the data bus, which is helpful because glitches can cause contention or bus conflict since a K state is already being driven by the device that is waking up the bus. Under normal operation, the data path would depend on synchronous clocks. To avoid having to wait for the reference clock PLL 420 to be active, the resume-K signaling may be done asynchronously through Tx data path 623, with line control held, e.g., for 10 ms before normal synchronous communications are resumed.

As the resume-K data is being reflected back onto the data line, the USB2 PHY 615 boot sequence and calibration routines for the rest of the PHY are run in the background while the data bus is being held for the resume-k, e.g., for a 10 ms time period in the case of the PHY working as a host (The resume-K might be driven for a duration of 1 ms in the case of the PHY functioning as a device.) After new calibration values and configuration register updates from the UTMI digital block 628 are available, pertinent registers for the data path are then updated, e.g., during inter-packet gaps.

Figure 7:
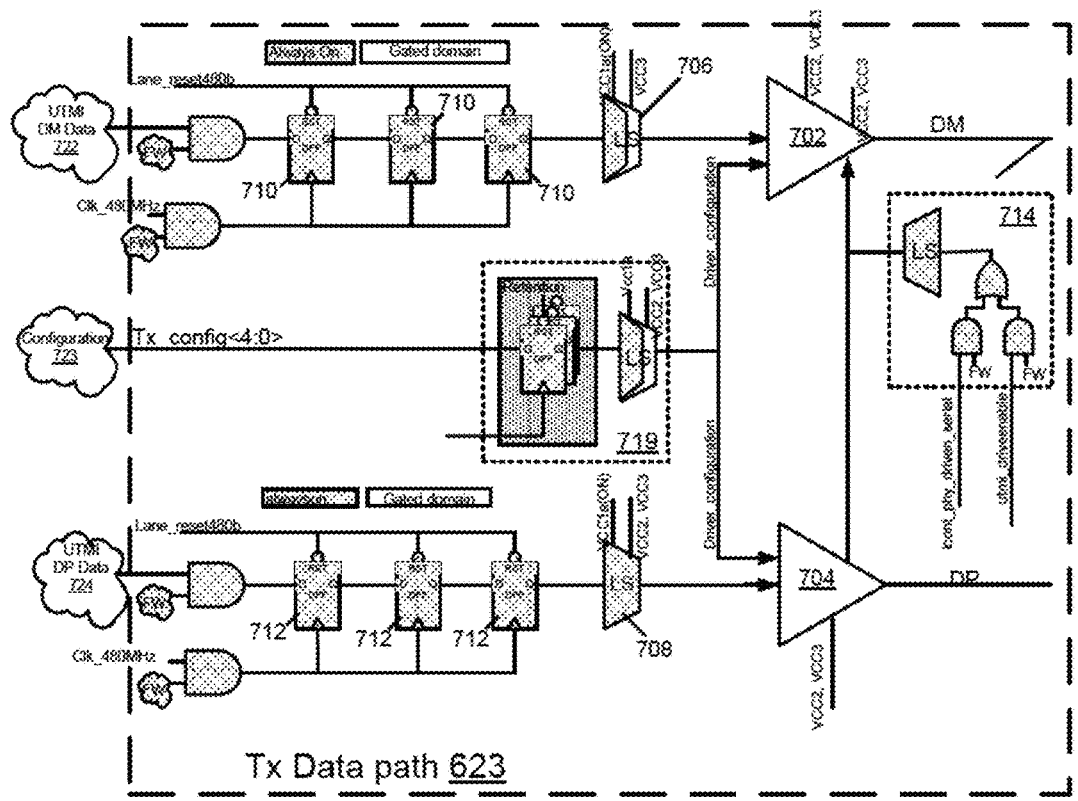
FIG. 7 is a diagram of a wake response (e.g., resume-K) asynchronous data path in accordance with some embodiments.

FIG. 7 shows in greater detail a transmitter data path 623 in accordance with some embodiments. This circuit may be used to asynchronously transmit a resume-K in response to a remote K wake event. The transmitter data path 623 generally comprises first (DM) and second (DP) differential data paths, enable circuitry 714, and configuration retention register block 719. The first (DM) differential data path circuit includes programmable driver 702, level shifter 706, and a register chain (formed from three sequentially-connected flops 710 in this embodiment), coupled together as shown. Similarly, The second (DP) differential data path circuit includes programmable driver 704, level shifter 708, and a register chain (formed from three sequentially-connected flops 712 in this embodiment), coupled together as shown. The enable circuit 714 is coupled to both data paths to enable data transmission by the USB2 controller (icont_phy_driven_serial) or by UTMI control logic (utmi_driveenable), the latter being used for asynchronous resume-K transmission in accordance with some embodiments disclosed herein. The configuration retention register block includes registers and a level shifter, and is coupled to both data path circuits, as well, for programming drivers 702, 704 for resume-K operation. The first and second data paths are coupled through firewalled gates to UTMI DM/DP data sources 722, 724, respectively.

Before the PHY enters the low power mode, the data path registers (710, 712) are controlled ("primed") to hold a K state. Driver configuration states are also retained through configuration retention block 719, which decreases latency significantly.

The shaded blocks are in always on domains (VCC1a). Accordingly, known K-state values will be maintained at registers (710, 712) and at the outputs of level shifters (706, 708). Thus, for example, when a connected device is in a Full Speed signaling mode (USB2), for the reflected resume-K signal, DM='1 and DP='0 may be stored in the data path register as the prime data to be reflected over the data line. On the other hand, if the connected device is in a Low Speed signaling mode, then DM would be '1 and DP would be '0.

The drive enable signal (icnt_phy_driven_serial) coming from the USB2 controller for enabling the drivers (702, 704) is firewalled to avoid contention over the data bus. (Firewall signals may come from the PG FSM, which are not shown in FIG. 7.) For similar, reasons, the UTMI drive enable signal (utmi_driveenable) coming from UTMI control logic (for UTMI parallel paths 722, 724) are also so firewalled.

The programmable drivers (702, 704) may be implemented with analog drivers. The DM and DP line configurations and speed indications (when resume K is to occur upon detection of a remote-K signal) are available and stored in retention block 719. Upon the PHY being enabled (and VCC2/VCC3 coming up) the drivers simply need to be enabled (UTMI drive enable signal) to reflect back the resume-K signal over the data line.

Figure 8:
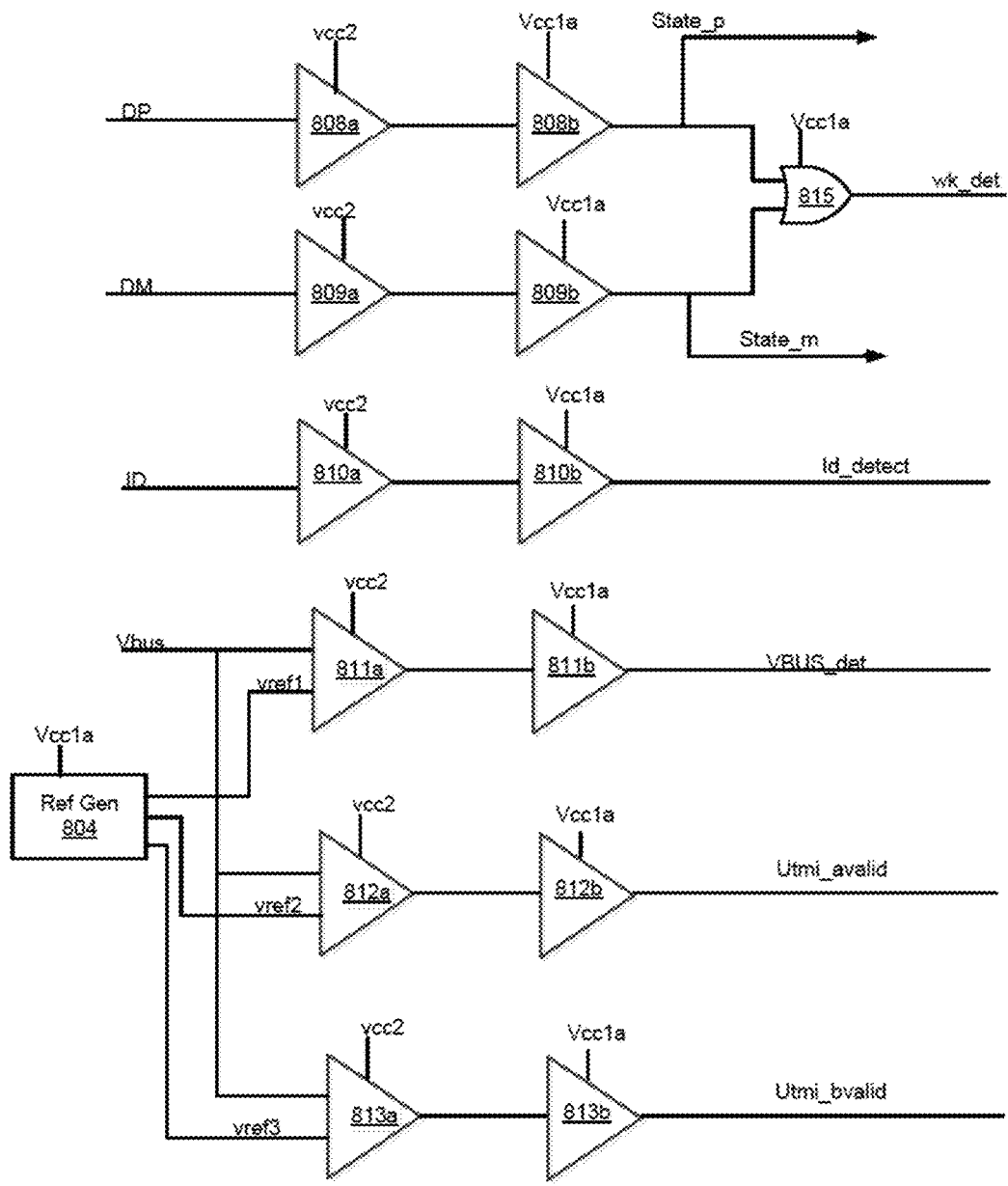
FIG. 8 is a diagram of a wake detection circuit in accordance with some embodiments.

FIG. 8 shows a wake detection circuit in accordance with some embodiments. It is responsible for detecting the state of the data bus during low power modes and to provide indication of a remote K so that a resume-K may be reflected back to a "waking" device. It may also be used for providing Vbus, Id, and UTMI status (or valid) signals. In the depicted embodiment, a wake detect (wk_det), Id detect (Id_det), and Vbus/UTMI status signals (VBUS_det, Utmi_avalid, Utmi_bvalid) are provided to the PMU. State signals (State_m, State_p) for the individual differential data lines (DM, DP) ate are provided to the PG FSM as an indication of speed. This may be used by the PG FSM for priming resume-K data in the data path.

The depicted wake detect circuit includes one or more reference generators 804, first-supply (e.g., lower voltage supply such as 1.8 V) detectors 808b to 813b, second-supply (higher voltage supply such as 3.3 V) detectors 808a-813a, and OR gate 815, coupled together as shown.

Detectors 808a/b, 809a/b, 810a/b, 810a/b, 811b, 812b, and 813b may be implemented with any suitable circuit for detecting a High or Low signal at its input and buffering to its output a signal with a logic level that corresponds to its input state. The second-supply detectors may have an internal threshold level approaching Vcc2/2. Similarly, the first-supply detectors may have an internal threshold close to Vcc1/2. Either the first-supply or the second-supply detectors could function as a level shifter to shift the signal from the second to the first supply domain.

In the depicted embodiment, the incoming Vbus signal (from USB2 connector) is used to detect if any device is detected and UTMI modes a or b are valid. Detectors 811a, 812a, and 813a each have an input connected to the incoming Vbus signal and a second input coupled to a reference voltage (vref1, vref2, or vref3) from the reference generator 804. They function as comparators to compare the voltage of Vbus against their associated reference voltage. If Vbus is higher than vref1, then 811a and 811b assert, resulting in the VBUS_det signal indicating a connected device. Similarly, depending on the values of vref2 and vref3, the Utmi_avalid and utmi_bvalid signals will be in states corresponding to the state of the UTMI logic. It also shows how the existing timing requirements for generating resume-K can be met with disclosed approaches.

Entrance into, and exit from, a reduced power (e.g., a suspend) mode in accordance with some embodiments will now be described. Upon detection of no line-state activity over the data bus (e.g., as monitored by the bus control logic) for more than, e.g., 3 ms, the USB2 controller may put the PHY into a suspend state and shut down each of the three power domains, with only the always on domain active. To do this, it may assert a utmi_suspendm indication to the PHY. Upon receiving the suspend state indication, the PHY (if acting as a host) may be placed into aggressive power saving through distributed power gating for multiple blocks. Before entering into the low power state, the states of the resume-K driver strength and calibration codes are stored in always on retention registers, while resume-K data path registers, also in an always on domain, are primed for a resume-K data output. The state of prime-K data will typically depend on the speed of a connected device. A host will usually reflect through a 15K pull-down over a USB2 data bus upon entering into a suspend state. On the other hand, if the PHY is in a device mode, it will reflect a weak pull-up over the DP (if full speed) or over the DM line (if low speed) upon entering a suspend state. The USB2 controller will also typically go into a low power state.

During the suspend mode, the wake detector continues waiting for any activity on the USB2 bus (e.g., wk_det asserts). A remote-K is detected when the PMU receives an asserted wake detect and the PG FSM receives State_m and State_P signals corresponding to a K state.

Figure 9:
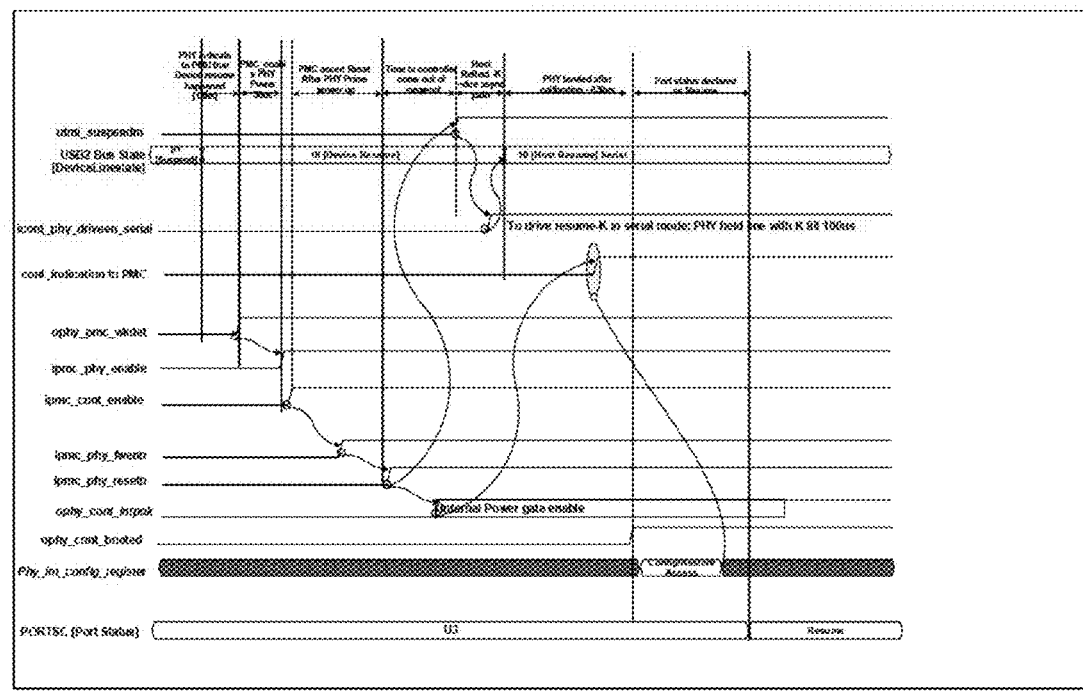
FIG. 9 is a timing diagram for signals during a resume-K operation in accordance with some embodiments.

Particular reference is now made to FIG. 9, which is a timing diagram showing different signals involved with the issuance of a resume-K when a remote-K event has been detected. The PMU enables the PHY power gate by asserting a phy enable signal (ipmc_phy_enable) and sending a phy reset signal (ipmc_phy_resetb) to reset the PG FSM. The ipmc_phy_fwenb firewall signals are asserted after an ack signal is received from PG FSM. The UTMI glue logic may be used to bring the PHY primary power within 20 us after getting indication of a ipmc_phy_fwenb indication. During this time, the PMU gives indication as ipmc_cont_enable (which may also be in a deepest low power state) to turn on the USB2 controller.

After coming out of reset, the USB2 controller keeps on waiting for the UTMI line state (as shown in FIG. 9), with the UTMI logic having been in the deepest power gating domain.

The PG FSM takes care of internal PHY gated domain firewall and power "good" signaling. The PG FSM then sends power good indication to the PMU. The PG FSM also enables UTMI glue logic. The UTMI glue logic (which detects the line state of the USB2 bus, similar to the PG FSM, and uses digital filtering to send resume-K (J-K transition) to controller through UTMI line state. The controller, upon getting indication of wake event, starts enabling the Tx path driver(s) to reflect resume-K & also speed indication to PHY so that PHY can drive K based on speed (FS/LS) that the PHY configures.

Upon getting resume-K signaling indication and speed indication (whether full speed or low speed), the PHY turns on the asynchronous path and starts driving the resume-K over bus based on the speed of the connected device. Resume K reflect will be quick since prime-K data is already available, which enhances glitch-free operation. Also, with driver configuration registers already programmed for operation, the resume-K reflection occurs quickly, as soon as a drive enable is asserted and the resume-k transmission drivers are turned on.

From here, the controller declares "resume" after monitoring the line state (Filter data of Single ended receiver output for both differential lines) and confirming that there is sufficient time, and then locks a port status register from being changed from the resume state. In the meantime, as the PHY is reflecting the resume-K, the PG FSM enables internal power gates to boot USB2 and waits for the ref clock to be enabled. Once the clocks are available, PLL boot, PLL calibration, and PLL lock can then occur. After the PLL clock comes on line, USB2 calibration starts running in the background. This calibration value may be updated (if there are any changes) during inter-packet gaps. Once calibration is complete, the PHY declares the USB2 interface to be booted.

It should be appreciated that a resume-K, in accordance with some embodiments, may be reflected to a waking device within a required 900 uS deadline. Initially, the wake detect signal asserts, indicating that a J or K state is on the line. Typically, this will take less than 1 uS. The asserted wake detect causes an asynchronous wake through the PMC to occur. This may take up to 50 uS. The power gates may then be enabled. This may take up to 20 uS. The PHY then powers up with priming of the resume-K data path occurring during this time. This takes as little as 1 uS. The PHY then waits for the PMC to reset. This may take up to 20 uS. The PHY then receives reset confirmation and confirms that the line state is valid (utmi_ln_st). Finally, the PHY (e.g., through UTMI logic) controls the resume-k data path (e.g., FS Tx data path) to issue the resume-K, which may then be held for about 10 mS, until bus control is handed to the USB2 controller. This allows for the BIOS restore (100 us), bulk register write configuration, PLL lock (70 uS), and transmitter calibration (650 uS) to be bypassed and performed in the background while the resume-K is being asynchronously driven onto the data lines.

Figure 10:
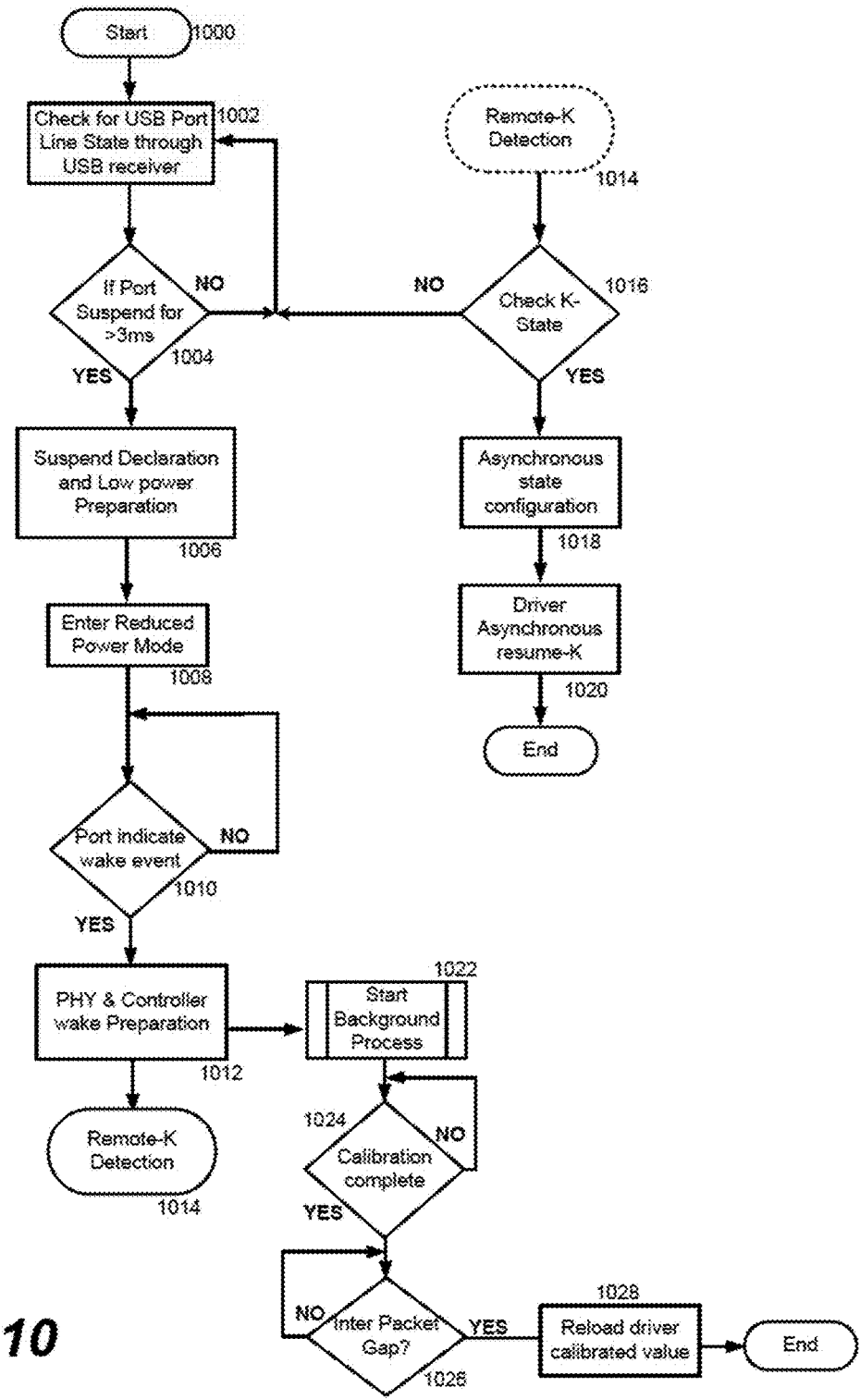
FIG. 10 is a flow diagram illustrating aggressive power saving along with resume-K operation in accordance with some embodiments

FIG. 10 is a flow diagram to graphically illustrate operation of a USB interface with aggressive power savings in accordance with some embodiments. At 1000, the controller (e.g., USB controller) boots up in response to an indication from a PMIC to enable the USB PHY. At 1002, USB port line status is checked. At 1004, it checks to see if a suspend state should be entered. For example, the controller may get an indication from the PHY that it has detected the line to be idle, e.g., for more than 3 mS, whereupon it may declare a suspend mode if it is not in a port reset condition. If this is satisfied, then the routine proceeds to 106; otherwise, it loops back to 1002.

At 1006, the suspend declaration is (or has been) made, and the controller initiates preparation for entry into the reduced power mode (e.g., aggressive power reduction mode). This may include the controller and PHY storing calibration values in retention registers and causing prim-K data to be stored in always-on resume-K data path domains. At 1008, the controller and PHY disable their power (apart from always-on domains) and configure in an aggressive (e.g., deepest) reduced power domain. At this point, wake detect circuitry may be enabled in an always-on domain.

At 1010, if a wake event occurs at the port, then the routine proceeds to 1012. Otherwise, it remains in the suspend mode. If the port is connected (or a remote device is connected), and a J State is detected, then the interface is to awaken.

At 1012, the PHY and controller undertake wake preparation. The PMU gets an indication of wake from the PHY and enables the PHY and controller power gates. It addition, resets for the controller and PHY may be generated, and the configuration register values may be reloaded after power-up. From 1012, the routine proceeds in two different directions. It starts background processes at 1022, and it checks for a remote-K state in order to timely reflect back a resume-K if a remote-K is detected. At 1016, if a valid K state is detected, then it proceeds to 1018 and if not, then it loops back up to 1002. At 1018, the controller initiates configuration for asynchronous resume-K data transfer. It releases the suspend state, and enables the data path and driver for the resume-K transmission. At 1020, with driver configuration already loaded (via retention registers), the prim-K data, already available in the transmission path data registers, is driven onto the data line.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS., for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
    an interface having a PHY and a data bus to be coupled to an external device, the PHY including:
        a transmitter driver to be powered off during a reduced power mode; and
        at least one data path register coupled to the driver, the at least one data path register to be powered during the reduced power mode and to be stored with resume data to respond to a wake event detected from the data bus to drive the stored data onto the bus in response to the wake event.

2. The chip of claim 1, in which the at least one data path registers comprise more than one register.

3. The chip of claim 1, in which the at least one register is a flop.

4. The chip of claim 1, in which the data path comprises multiple registers sequentially coupled together.

5. The chip of claim 1, in which the data path is part of a full speed transmitter data path for a USB capable interconnect.

6. The chip of claim 1, further comprising a wake detect circuit to be at least partially powered on during the reduced power mode to monitor data bus line state.

7. The chip of claim 6, in which the wake detect circuit is to provide indication of the wake event to a PMU external to the PHY to wake up the PHY.

8. The chip of claim 6, in which the wake detect circuit is to provide indication of the wake event to power domain control logic within the PHY to wake up the PHY.

9. The chip of claim 1, comprising a retention register to be powered on during the reduced power mode to store configuration information for the transmitter driver.

10. An apparatus, comprising:
    a transceiver to drive data onto a data line from the transceiver, wherein the transceiver includes a plurality of transmitters;
    wherein the transceiver is to be powered by two or more different supply domains including an always on domain to provide power to data path circuitry in one of the transmitters, of the plurality, during a reduced power mode to retain data for driving a resume state onto the data path in response to a wake state detected on the data path; and
    a wake detect circuit that is at least partially powered by the always on domain to detect the wake state during the reduced power mode and to provide an indication of the detected state.

11. The apparatus of claim 10, in which the wake state is a remote-K wake state.

12. The apparatus of claim 10, in which one of the transmitters includes an output driver that is to be powered off during the reduced power mode.

13. The apparatus of claim 12, comprising a retention register powered by the always on supply to provide driver configuration data to the output driver when it is powered up for the resume state.

14. The apparatus of claim 10, comprises power gates to control power domains from the two or more different domains.

15. The apparatus of claim 10, in which the one of the transmitters is a full speed transmitter for a USB2 interface.

16. A mobile device, comprising:
    a system-on-chip having:
        a transceiver to drive data onto a data line from the transceiver, wherein the transceiver includes a plurality of transmitters;
        wherein the transceiver is to be powered by two or more different supply domains including an always on domain to provide power to data path circuitry in one of the transmitters, of the plurality, during a reduced power mode to retain data for driving a resume state onto the data path in response to a wake state detected on the data path.

17. The mobile device of claim 16, in which the wake state is a remote-K wake state.

18. The mobile device of claim 16, in which one of the transmitters includes an output driver that is to be powered off during the reduced power mode.

19. The mobile device of claim 18, comprising a retention register powered by the always on supply to provide driver configuration data to the output driver when it is powered up for the resume state.

20. The mobile device of claim 16, wherein the SOC chip comprises a wake detect circuit that is at least partially powered by the always on domain to detect the wake state during the reduced power mode and to provide an indication of the detected state.

* * * * *